United States Patent [19]

Manning et al.

[11] Patent Number: 4,783,186

[45] Date of Patent: Nov. 8, 1988

[54] AEROSOL DISPENSER AND APPLICATOR ASSEMBLY FOR CLEANING AND LUBRICATING SPROCKET CHAINS

[76] Inventors: Terry Manning, 76 Ravine Ave., Wyckoff, N.J. 07481; Pierre Chares, 101 Mawhinney Ave., Hawthorne, N.J. 07506

[21] Appl. No.: 7,362

[22] Filed: Jan. 27, 1987

[51] Int. Cl.⁴ ............................................. A46B 11/02
[52] U.S. Cl. .................................. 401/190; 184/15.1; 184/16; 401/9; 401/10; 401/288
[58] Field of Search ....................... 401/9, 10, 11, 190, 401/288; 184/15.1, 15.2, 15.3, 16, 17

[56] References Cited

U.S. PATENT DOCUMENTS

| | | | |
|---|---|---|---|
| 1,189,505 | 7/1916 | Stockton | 401/10 |
| 1,586,262 | 5/1926 | Noble | 401/10 |
| 3,823,797 | 7/1974 | Ducatillon | 184/16 |
| 3,828,890 | 8/1974 | Schott et al. | 184/15.1 |
| 3,934,677 | 1/1976 | Schott et al. | 184/15.1 |
| 3,966,335 | 6/1976 | Abramson | 401/10 |
| 3,981,597 | 9/1976 | Cohn | 401/190 |
| 3,989,388 | 11/1976 | Sparr, Sr. | 401/11 |
| 4,069,894 | 1/1978 | Black | 184/15.1 |

FOREIGN PATENT DOCUMENTS

| | | | |
|---|---|---|---|
| 3332175 | 3/1985 | Fed. Rep. of Germany | 184/15.1 |
| 999593 | 7/1965 | United Kingdom | 401/190 |

OTHER PUBLICATIONS

"Allsop Chain Cleaner Lubricant System" Performance Bicycle Shop Catalog, Holiday Catalog 1986.

Primary Examiner—Steven A. Bratlie
Attorney, Agent, or Firm—Michael Ebert

[57] ABSTRACT

An aerosol dispenser and applicator assembly for cleaning and lubricating the sprocket chain of a chain drive. The dispenser comprises a sealed can filed with a liquid lubricant and a gas propellant. Projecting above the upper end of the can is the hollow stem of a spring-biased valve, such that when the stem is depressed, emitted therefrom is a lubricant mist. The applicator is formed by a headpiece having a pair of parallel jaws cantilevered therefrom and supporting respective brushes in opposed relation to define a twin brush whose bristles are flexible. Formed in the twin brush is an internal channel which snugly accommodates the sprocket chain to be treated when the twin brush is pushed against the chain to cause the opposing bristles to yield and admit the chain into the channel. The headpiece includes a depressible actuator key on whose underside is a hollow socket which receives the stem when the headpiece is seated on the upper end of the can. A nozzle communicating with the socket extends into an outlet in the headpiece leading to the twin brush. When the actuator key is depressed, the twin brush is then sprayed and its bristles are saturated with the lubricant. As the chain advances through the channel, all of its links are scrubbed by the twin brush and are lubricated thereby when the bristles are saturated with lubricant.

8 Claims, 2 Drawing Sheets

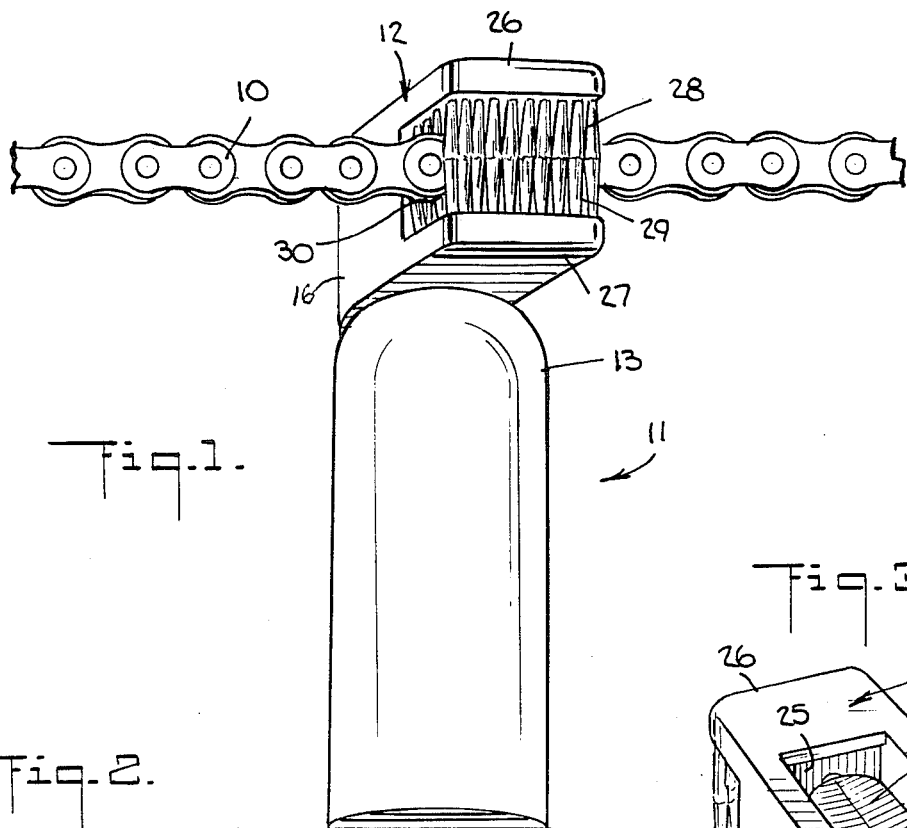
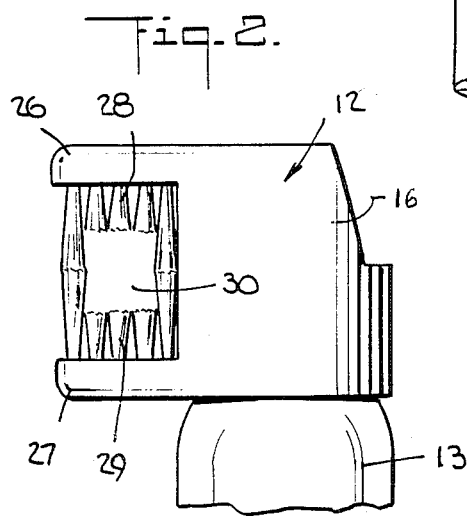
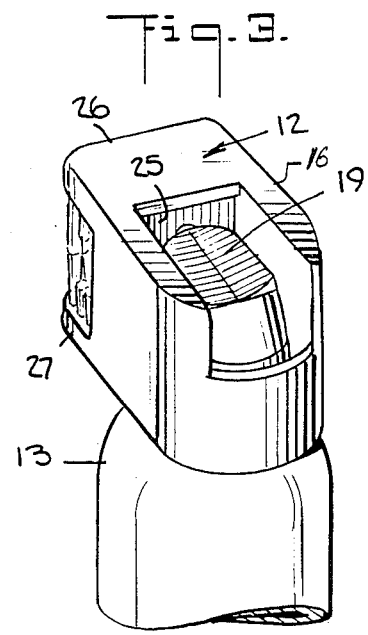
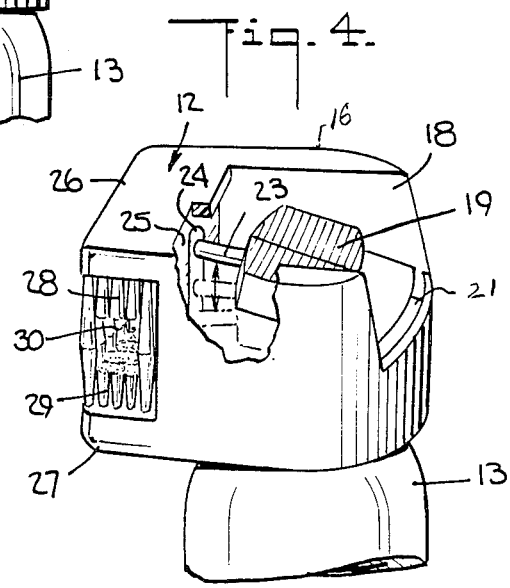

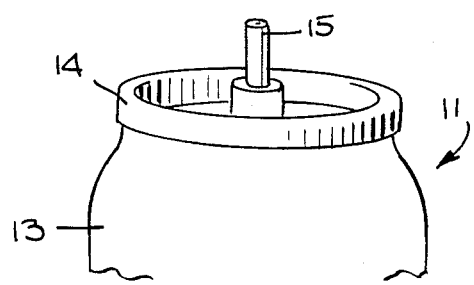
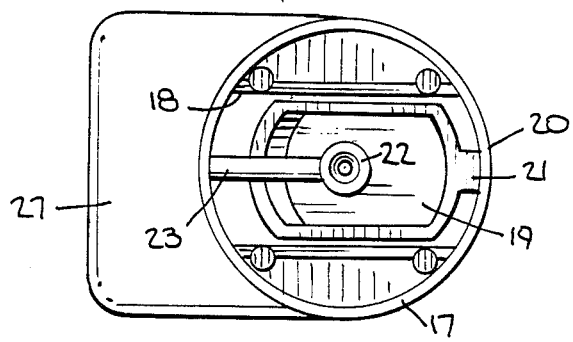
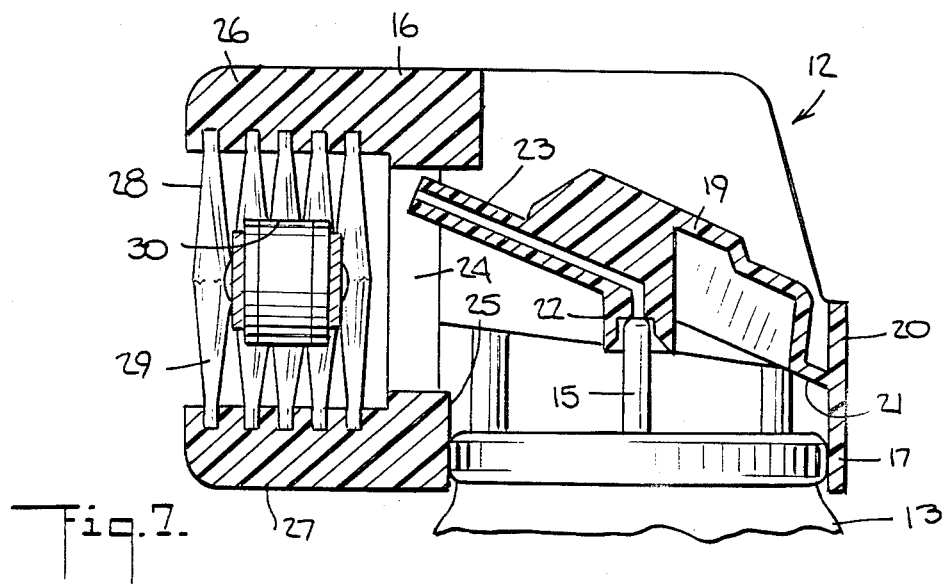
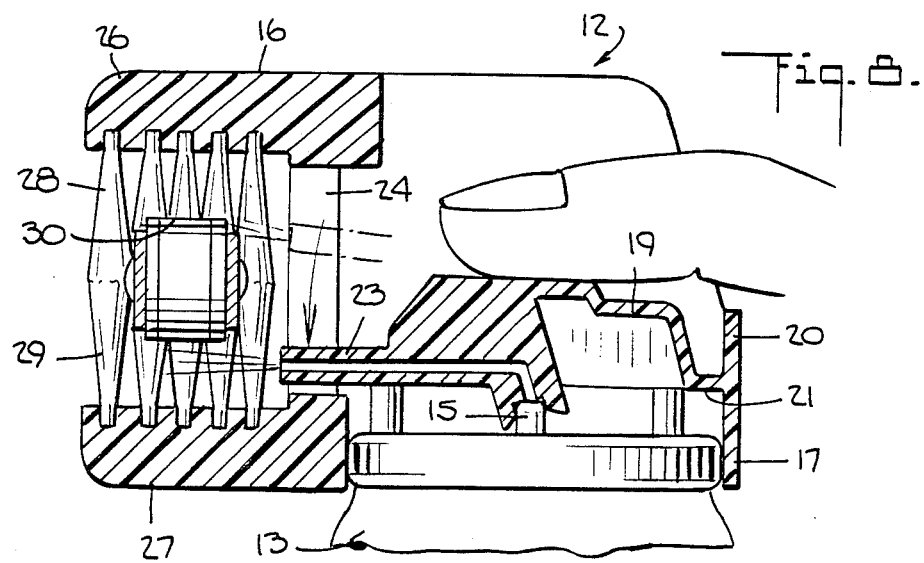

AEROSOL DISPENSER AND APPLICATOR ASSEMBLY FOR CLEANING AND LUBRICATING SPROCKET CHAINS

BACKGROUND OF INVENTION

1. Field of Invention

This invention relates generally to devices for cleaning and lubricating the sprocket chain of a chain drive mechanism, and more particularly to a hand-held aerosol dispenser and applicator assembly for this purpose.

2. Status of Prior Art

The present invention is useful for cleaning and lubricating, in situ, the sprocket chain of any positive chain drive mechanism of the type found, for example, in motorcycles and bicycles. For convenience, the invention will be described in the context of a bicycle chain drive. It is to be understood, however, that sprocket chains come in various sizes, and that an assembly in accordance with the invention can be dimensioned to accommodate any commercially-available sprocket chain.

In a bicycle, the positive chain drive is constituted by a continuous sprocket chain loop whose links at one end of the loop engage a sprocket associated with the pedals of the bicycle and at the other end engage a sprocket associated with the rear wheel. The arrangement is such that when the pedals are operated to rotate the associated sprocket in the clockwise direction, this acts to advance the sprocket chain loop in the same direction and to drive the rear wheel; but when the pedals are operated to rotate the sprocket counterclockwise, the loop is advanced in the reverse direction and the rear wheel is then disengaged from its associated sprocket. Hence when an assembly in accordance with the invention is used to treat the sprocket chain on a bicycle, one then advances the sprocket chain loop in the reverse direction so that the rear wheel is not driven thereby.

The effort a rider must exert to operate a bicycle depends in good part on effective lubrication. If the wheel bearings and the chain drive are inadequately lubricated, the resultant friction not only makes it more difficult for the rider to pedal the bicycle, but it also results in wear and possible overheating of the sliding metal components, giving rise to destructive metal fatigue. And since the sprocket chain which is exposed has a greasy surface, in the course of operation it tends to pick up grit and dirt particles which adhere to the chain and introduce friction.

Conscientious bicycle owners are aware of the need to maintain the sprocket chain in a clean and well lubricated condition; but with existing expedients for this purpose it is difficult to do so. Thus, before applying a lubricant to the chain, the usual practice is to wipe it clean with a rag to remove the grime therefrom. But since the chain loop is composed of a continuous series of links that are pivotally interconnected, it is difficult with a rag to thoroughly clean the chain. It is even more difficult with a conventional oil can having a nozzle to apply lubricant to the entire chain so that all of its links and their pivot pins are properly lubricated.

The prior art recognizes this problem and discloses various expedients with a view to solving the problem. Thus, the Thalmann U.S. Pat. No. 4,593,923, discloses a reservoir which is so attached to the bicycle that as the sprocket chain advances, it passes through the reservoir which contains a solvent as well as brushes to clean the chain. No lubrication is involved in this arrangement.

A somewhat similar sprocket chain cleaner is shown in the Chiarelli U.S. Pat. No. 4,578,120. But in this instance, the reservoir is provided with rotary brushes which are turned by the sprocket chain, the reservoir containing either a solvent or a lubricant.

The practical drawback to the Thalmann and Chiarelli schemes is that they both require an attachment to the bicycle; hence each time the device is put to use, it must be bolted or otherwise secured to the bicycle and then later detached therefrom.

The Schlott U.S. Pat. No. 3,937,677 discloses an aerosol lubricant can which is coupled to an applicator head that has a permanent magnet thereon to maintain the head in alignment with the chain during movement of the chain relative to the head. There are no cleaning brushes in this arrangement.

Inasmuch as the present invention involves the combination of an aerosol can containing a lubricant in combination with an applicator brush, of background interest is the Bergmann et al. U.S. Pat. No. 3,135,990, in which an aerosol can containing a soap solution is coupled to a scouring brush. But this has nothing to do with chain lubrication.

Hoxie, U.S. Pat. No. 3,184,781, shows an aerosol can associated with a brush to create an upholstery shampooer. Hillis, U.S. Pat. No. 4,502,175, shows a fire hose cleaner formed by a pair of opposed brushes through which the hose is drawn, the brushes being fed with water from a fire hydrant.

SUMMARY OF INVENTION

In view of the foregoing, the main object of this invention is to provide an aerosol and applicator assembly capable of both cleaning and lubricating, in situ, the sprocket chain of a chain drive mechanism.

A significant feature of the invention is that the assembly is hand-held, and is not attached to the bicycle or other apparatus provided with a chain drive mechanism.

More particularly, an object of this invention is to provide a hand-held assembly of the above type which includes a twin brush through which passes the sprocket chain to be treated while the assembly is being hand-held at a fixed position, whereby as the chain advances, all surfaces of the successive links thereof are scrubbed by the bristles of the twin brush to dislodge dirt and grit therefrom.

Also an object of the invention is to provide an assembly of the above type in which the can of the aerosol dispenser serves as the handle therefor, the dispenser, when activated, acting to saturate the bristles of the twin brush with lubricant.

Yet another object of the invention is to provide an assembly of the above type in which the applicator is removable from the dispenser whereby the dispenser when exhausted can be readily replaced. The detachable applicator also facilitates cleaning of the applicator twin brush.

Briefly stated, these objects are attained in an aerosol dispenser and applicator assembly for cleaning and lubricating the sprocket chain of a chain drive. The dispenser comprises a sealed can filled with a liquid lubricant and a gas propellant. Projecting above the upper end of the can is the hollow stem of a spring-biased valve, such that when the stem is depressed, emitted therefrom is a lubricant mist. The applicator is formed by a headpiece having a pair of parallel jaws cantilevered therefrom and supporting respective brushes in opposed relation to define a twin brush whose bristles are flexible. Formed in the twin brush is an internal channel which snugly accommodates the sprocket chain to be treated when the twin brush is pushed against the chain to cause the opposing bristles to yield and admit the chain into the channel. The headpiece includes a depressible actuator key on whose underside is a hollow socket which receives the stem when the headpiece is seated on the upper end of the can. A nozzle communicating with the socket extends into an outlet in the headpiece leading to the twin brush. When the actuator key is depressed, the twin brush is then sprayed and its bristles are saturated with the lubricant. As the chain advances through the channel, all of its links are scrubbed by the twin brush and are lubricated thereby when the bristles are saturated with lubricant.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a hand-held aerosol dispenser and applicator assembly in accordance with the invention;

FIG. 2 is a side view of the assembly;

FIG. 3 is a perspective view of the applicator as seen looking down on its actuator key;

FIG. 4 is a cut away view of the headpiece of the applicator;

FIG. 5 separately illustrates the upper end of the aerosol can;

FIG. 6 is a bottom view of the applicator;

FIG. 7 is a section taken through the applicator when it engages a chain, the applicator being unactuated; and FIG. 8 shows the actuator when actuated.

DESCRIPTION OF INVENTION

Referring now to FIG. 1, there is shown a hand-held aerosol dispenser and applicator assembly in accordance with the invention in operative engagement with the sprocket chain 10 of a chain drive mechanism on a bicycle or any other apparatus. The sprocket chain is of conventional form and is constituted by a series of pivotally-interconnected links.

The assembly consists of an aerosol dispenser, generally designated by numeral 11, to which is removably attached an applicator, generally designated by numeral 12.

An aerosol is a colloidal system in which minute particles are dispersed in and surrounded by a gas. A conventional aerosol dispenser makes use of a metal can filled with the liquid to be sprayed and a propellant gas under pressure. The can is sealed by a spring-biased discharge valve which when actuated by the user releases the spray. Aerosol dispensers are well known and are disclosed in many prior patents, including the St. Germain U.S. Pat. No. 2,746,796.

The aerosol dispenser included in the assembly, as best seen in FIG. 5, is provided with a metal can 13 filled with a liquid lubricant suitable for lubricating a sprocket chain, and a pressurized propellant gas, such as Freon. A preferred lubricant for this purpose is the hybrid lubricant disclosed in the Reick U.S. Pat. No. 4,333,840, which is constituted by a dispersion of microfine PTFE particles in an oil carrier diluted with a synthetic lubricant.

This hybrid lubricant not only reduces wear and friction, but it also creates a protective coating on the treated metal surface, which coating resists the adhesion thereto of grime and other contaminants. While this patented hybrid lubricant is especially adapted to meet the requirements of firearms, it has been found to be also useful for sprocket chains because of the grime normally acquired by such chains in the course of operation. By the use of this hybrid lubricant, the build-up of grime is minimized.

The upper end of can 13 is provided with a circular mounting ring 14. Projecting upwardly from the center of the upper end of can 13 is the hollow stem 15 of a spring-biased valve (not shown) disposed within the can, stem 15 being coaxial with ring 14. When the stem is fully extended, the valve is closed; but when it is depressed axially, the valve is opened, whereby emitted from the stem is a lubricant mist.

Applicator 12, which may be molded of synthetic plastic material such as polyethylene or polypropylene is constituted by a headpiece 16 having a circular neck 17 that is dimensioned to frictionally engage ring 14 when the headpiece is seated on the upper end of can 13. This makes it possible to readily attach the applicator to the can or to detach it therefrom. Headpiece 16 is provided with a cut-out or recess 18 within which is disposed an actuator key 19 that is pivoted from the right wall 20 of the headpiece by a living hinge 21 so that the key is depressible. On the underside of the key is a tubular socket 22 into which is received the stem 15 when the headpiece is seated on the can.

Projecting forwardly from key 19 and communicating with socket 22 is a nozzle pipe 23 which extends into an outlet 24 on the flat left wall 25 of the headpiece. Cantilevered from wall 25 are a pair of parallel jaws 26 and 27. Anchored on the underside of upper jaw 26 is a brush 28 formed by parallel rows of flexible bristle clusters which extend downwardly to the midpoint of the gap between the jaws, the outlet 24 communicating with this gap. Anchored on the upper side of jaw 27 is a brush 29 which is identical to brush 28 to define therewith a twin brush in which the bristles of the two brushes are in opposed relation.

Cut into the bristles of the twin brush and symmetrically disposed therein is a channel 30 having a rectangular cross section that substantially matches the cross section of sprocket chain 10. The twin brush is formed by strong flexible bristles, preferably of nylon or other synthetic filamentary material capable of withstanding abrasion by the advancing chain. When the user presses the exposed side of the twin brush against one side of the sprocket chain, the opposing bristles then yield to admit the chain into channel 30 so that now all surfaces of the chain are engaged by flexible bristles, as shown in FIG. 1.

When, therefore, the assembly is used on a sprocket chain that is very dirty, the applicator may then be used as a scrubbing brush so that as the assembly is held in the hand of the user while the chain is advanced therethrough, the bristles dislodge the grime from the chain surfaces. A detergent solution may be applied to the twin brush to promote the removal of the grime, after which the twin brush is cleaned.

If now one wishes to lubricate the chain, the actuator key is depressed to spray a lubricant mist into the twin brush. Because the mist is emitted under pressure, the lubricant which is ejected against the inner side of the twin brush penetrates the brush to saturate all of its bristles. The oil-saturated bristles, as the chain advances through the channel, then act to brush lubricant onto all surfaces of the chain to ensure thorough lubrication thereof. The actuator key may be repeatedly operated to ensure adequate lubrication of the chain.

The cleaning and lubricating actions need not be carried out in separate steps; for unless the chain is very dirty, as the chain is being lubricated, it is also being scrubbed clean, so that the dirt particles are transferred to the oily bristles. One can then later clean the dirty and oily bristles with a solvent such as benzene or turpentine.

While there has been shown and described a preferred embodiment of an aerosol dispenser and applicator assembly for cleaning and lubricating sprocket chains in accordance with the invention, it will be appreciated that many changes and modifications may be made therein without, however, departing from the essential spirit thereof. Thus, instead of a conventional aerosol dispenser, one may use a dispenser having a metering valve so that each time the actuator key is depressed, a metered amount of lubricating oil is emitted, thereby avoiding an excessive discharge of oil.

We claim:

1. An aerosol dispenser and applicator assembly for cleaning and lubricating the sprocket chain of a chain drive mechanism, comprising:
    A. a sealed can containing a liquid lubricant and a gas propellant, a hollow stem projecting above the upper end of the can and a mounting ring on the upper end of the can surrounding the stem, the stem cooperating with a spring-biased valve disposed within the can whereby when the system is depressed, a lubricant spray is emitted therefrom; and
    B. an applicator formed by a removable headpiece having a circular neck adapted to frictionally engage the mounting ring of the can to seat the headpiece of the upper end of the can, said headpiece being provided with a pair of parallel jaws cantilevered therefrom and supporting respective brushes in opposed relation to define a twin brush having flexible bristles, an internal channel being formed in the twin brush which snugly accommodates the sprocket chain when the twin brush is pushed against the chain to cause the opposing bristles thereof to yield and admit the chain into the channel, said headpiece including a depressible actuator key on whose underside is a hollow socket which receives the stem when the headpiece is seated on the upper end of the can, and a nozzle communicating with the socket extending into an outlet in the headpiece leading to the twin brush, whereby when the actuator key is depressed, the twin brush is then sprayed to saturate its bristles with the lubricant.

2. An assembly as set forth in claim 1, wherein said headpiece is molded of synthetic plastic material.

3. An assembly as set forth in claim 1, wherein said key is hinged to the headpiece by a living hinge.

4. An assembly as set forth in claim 1, wherein said brushes are formed by parallel rows of bristle clusters.

5. An assembly as set forth in claim 4, wherein said bristles are of nylon.

6. An assembly as set forth in claim 1, wherein said lubricant is constituted by a colloidal dispersion of microfine PTFE particles in a lubricating oil carrier.

7. An assembly as set forth in claim 1, wherein said channel has a rectangular cross section which substantially matches the cross section of the chain.

8. An assembly as set forth in claim 7, wherein said chain is the sprocket chain of a bicycle.

* * * * *

UNITED STATES PATENT OFFICE
CERTIFICATE OF CORRECTION

PATENT NO. : 4,783,186

DATED : November 8, 1988

INVENTOR(S) : Terry Manning et al.

It is certified that error appears in the above-identified patent and that said Letters Patent are hereby corrected as shown below:

Column 6, line 4, "of" (first occurrence) should read --on--

Signed and Sealed this

Twenty-first Day of March, 1989

Attest:

DONALD J. QUIGG

*Attesting Officer*

*Commissioner of Patents and Trademarks*